A. FRANÇOIS.
METHOD OF MAKING FISSURED WATER BEARING STRATA WATER-TIGHT.
APPLICATION FILED DEC. 9, 1920.
1,430,306.
Patented Sept. 26, 1922.
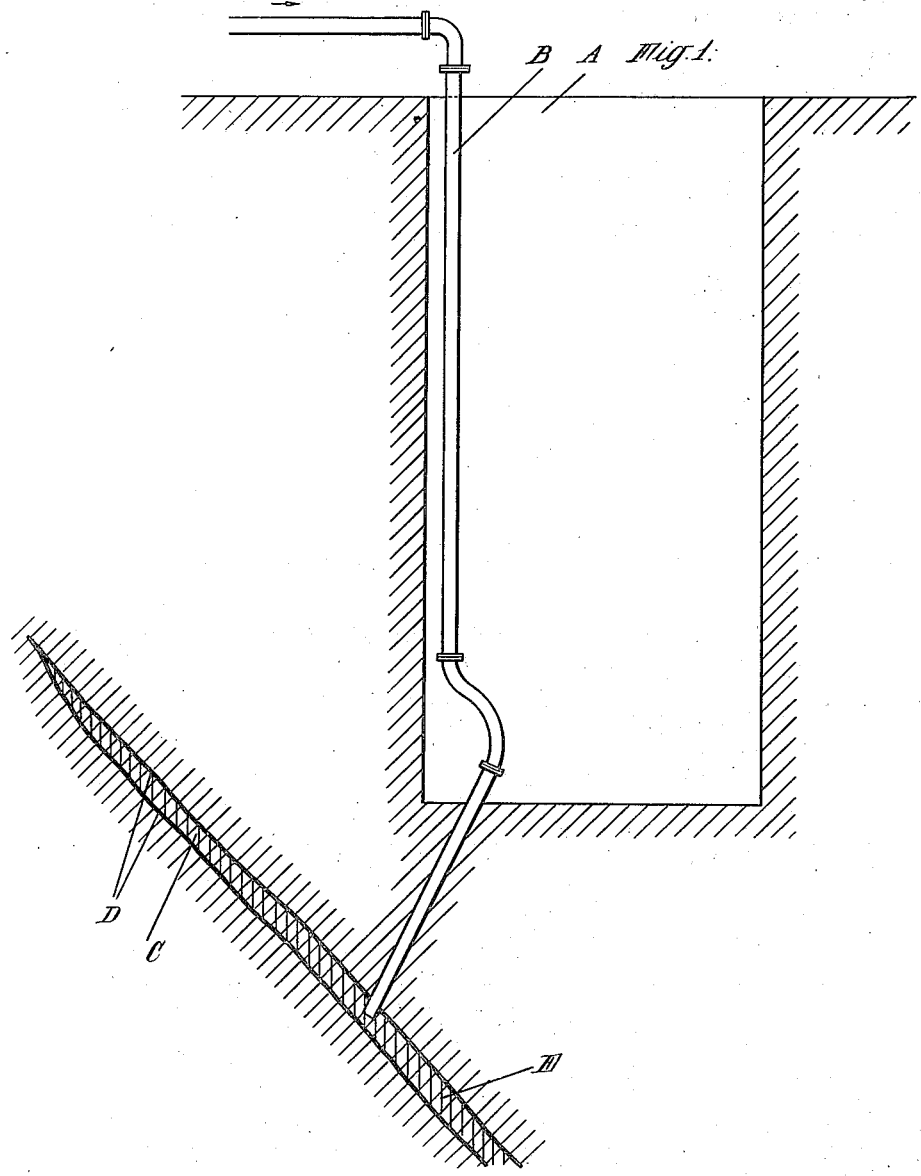
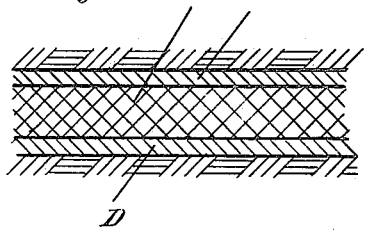
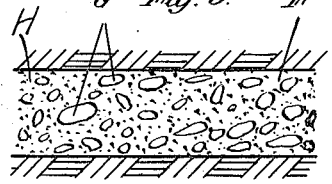

Patented Sept. 26, 1922.

1,430,306

UNITED STATES PATENT OFFICE.

ALBERT FRANÇOIS, OF HATFIELD, NEAR DONCASTER, ENGLAND.

METHOD OF MAKING FISSURED WATER-BEARING STRATA WATER-TIGHT.

Application filed December 9, 1920. Serial No. 429,554.

*To all whom it may concern:*

Be it known that I, ALBERT FRANÇOIS, a subject of the King of Belgium, residing at Broom Lodge, Hatfield, near Doncaster, Yorkshire, England, have invented certain new and useful Improvements in Methods of Making Fissured Water-Bearing Strata Water-Tight (for which I have filed applications as follows: Belgium, No. 265,867, filed March 20, 1914; Great Britain, No. 8482, filed Apr. 3, 1914; Germany, filed Apr. 5, 1914; Poland, filed Sept. 3, 1920; Austria, filed June 21, 1920; Czecho-Slovakia, filed July 10, 1920; Hungary, filed June 28, 1920; France, filed Sept. 15, 1914, Patent No. 470,-528), of which the following is a specification.

This invention relates to a method of rendering fissured water-bearing strata impervious to water by means of cement and has for object to provide a new or improved method of stopping fissures or crevices wherein cement could not hitherto be made to enter. This is the case for instance with very fine fissures and fissures that contain silt, clay or sand which latter acts as a filter and prevents the penetration of cement.

It is well known that in the case of porous rocks the pores, and sometimes even the very fine fissures existing in such rocks can be stopped by injecting separately therein solutions of substances, such as commercial silicate of soda and sulphate of alumina which react so as to give rise within the soil, to a precipitate of a gelatinous or colloidal nature.

The present invention is based on the observed fact that when the aforesaid colloidal substance is injected into such fissures as will not admit cement, cement can afterwards be easily injected therein.

According to the invention the colloidal substance is employed, not for stopping fissures, but for preparing the same to receive cement.

In order that the said invention may be clearly understood and readily carried into effect the same will now be described more fully with reference to the accompanying drawing in which:—

Figure 1 is a section of a shaft which is being sunk through water-bearing strata, and Figure 2 is an enlarged sectional view of part of the fissure shown in Figure 1 after the same has been filled by the present process.

Figure 3 is a sectional view of part of a large fissure containing loose soil which has also been treated by the present process.

Referring to Figures 1 and 2, A is the shaft sinking. B is a pipe leading from a pump (not shown) through which the chemicals and also the cement are injected into the water-bearing strata. C is the fine fissure in the strata. D is the layer of chemicals which have been fed into the fissure through the pipe B and deposited along the walls thereof and E is the cement injected into the fissure which has been thus prepared for its reception.

Referring to Figure 3, F is a large fissure containing loose soil G, and H is the chemical substance which penetrates the loose soil and prevents the same from setting into a mass, while at the same time, owing to its slight consistency, leaving no obstacle to the subsequent penetration of the cement.

When during the progress of cementation in water-bearing strata there is met a spot where cement cannot be made to enter, a gelatinous precipitate of the before mentioned kind is forced therein. For this purpose a ready made mixture of suitable chemical solutions is preferably injected, that is a liquid holding a suspension the gelatinous or colloidal precipitate already formed. The injection is continued until the pressure gauge of the pump shows a rise of pressure denoting the stoppage of the fissures in the ground and a cement milk is then injected in the usual manner. On examining a section through a fissure thus cemented, a thin layer of the chemicals first injected will be found between the cement and the walls of the fissure.

It would seem as if in the case of fine fissures the colloidal substance acts somewhat after the manner of a lubricant which nullifies the frictional resistance of the walls of the fissures to the penetration of the cement and in the case of larger fissures containing sand, silt or clay, the colloidal substance appears to penetrate between the particles of silt, sand or clay and thus prevent the same from setting in a compact mass whereas the slight consistency of the said colloidal substance form no obstacle to the subsequent penetration of cement.

What I claim and desire to secure by Letters Patent of the United States is:—

1. A process for making fissured water-bearing strata watertight in cases where cement milk is injected and when it is found that the cement does not normally penetrate the fissures consisting in stopping the cementation step, injecting into the fissures a mixture in the form of a liquid holding a gelatinous precipitate in solution and thereafter resuming the injection of cement.

2. A process of filling fissures consisting in initially injecting colloidal material and thereafter in injecting cement milk.

3. A process of filling fissures consisting in injecting into the fissures solutions of substances which react so as to give rise to a precipitate of a gelatinous material and thereafter in injecting cement milk.

4. A process of making water-bearing strata watertight which consists in preparing the ground for the injection of cement by injecting into the same a chemical substance which prevents the soil from acting as a filter and thereafter in injecting cement into the strata which has been so treated.

5. A process of making fissured water-bearing strata watertight which consists in initially injecting a solution containing a colloidal precipitate formed from commercial silicate of soda and sulphate of alumina and thereafter in injecting cement.

6. A process of making fissured water-bearing strata watertight which consists in preparing the fissure to receive cement by initially introducing into the same commercial silicate of soda and thereafter in injecting cement milk into the fissure which has been so prepared for its reception.

ALBERT FRANÇOIS.